United States Patent
Fisher

[15] 3,647,406
[45] Mar. 7, 1972

[54] METHOD OF ACHIEVING SURFACE REFRACTIVE INDEX CHANGES IN A GLASS LIGHT GUIDE ELEMENT

[72] Inventor: George M. C. Fisher, Homdel, N.J.
[73] Assignee: Bell Telephone Laboratories, Incorporated, Murray Hill, Berkeley Heights, N.J.
[22] Filed: Nov. 4, 1968
[21] Appl. No.: 772,970

[52] U.S. Cl. ............................................. 65/30, 65/4, 65/3, 65/DIG. 7, 350/96, 350/178, 161/175, 65/60
[51] Int. Cl. .................. C03c 15/00, F16c 1/06, G02b 5/14
[58] Field of Search ..................... 65/30, 3, 4, 60; 161/175; 350/178, 96

[56] References Cited

UNITED STATES PATENTS 3,320,114  5/1967  Fisher ................................. 65/30 X
3,486,808  12/1969  Hamblen ............................. 350/175

FOREIGN PATENTS OR APPLICATIONS 966,735  8/1964  Great Britain ........................... 65/30

Primary Examiner—Frank W. Miga
Attorney—R. J. Guenther and Edwin B. Cave

[57] ABSTRACT

The surface index of refraction of a light-guiding glass is controllably increased or decreased by changing the alkali metal ion concentration at the surface. In one approach, these ions are replaced with similar ions of differing ionic radius. A gaseous source of replacement ions and capable of extracting the surface ions is passed over the glass surface at temperatures sufficient to permit an ion diffusion inward. Control of the process parameters permits regulating the exchanged ion layer depth and approximating a definite refractive index gradient, which is not possible with conventional cladding. Optical light guides achievable with the process are disclosed.

3 Claims, 7 Drawing Figures

PATENTED MAR 7 1972 3,647,406

INVENTOR
G.M.C. FISHER
BY Charles E. Graves
ATTORNEY

METHOD OF ACHIEVING SURFACE REFRACTIVE INDEX CHANGES IN A GLASS LIGHT GUIDE ELEMENT

FIELD OF THE INVENTION

This invention concerns processes for producing light guide articles such as optical rods or fibers; and in particular relates to a process that achieves the requisite refractive index differences in the article without resort to conventional cladding techniques.

BACKGROUND OF THE INVENTION

As is well known, the transmission of a maximum of light through an optical fiber or rod with a minimum of lateral loss is dependent on two principal conditions. First, the element's surface, or the surrounding medium, must have a refractive index which is lower than the core index. Second, internal transmission of a ray without reflection loss requires that the angle which the ray makes with the normal to the internal reflecting surface shall exceed a critical angle whose sin is the ratio of the cladding refractive index $N_1$ to the core refractive index $N_2$. The two refractive indices $N_1$ and $N_2$ also come into play in establishing the maximum external angle of incidence $U$ of a ray upon a rod end for the ray to undergo total internal reflection; where $n$ is the refractive index of the medium from which the ray enters the fiber, $$U = \sin^{-1}\{1/n(N_1^2 - N_2^2)\}$$

The angle $U$ is also referred to as the acceptance cone half-angle.

Total internal reflection can be achieved if the element is surrounded in use by a single substance of lower index, such as air. When several such elements are in contact as in an optical fiber bundle, lateral losses which would otherwise occur are avoided by cladding the element with a second material such as another glass of lower refractive index than the core. Typically, the cladding process involves drawing a fiber from two glass melts of dissimilar composition in such a way that upon cooling one glass forms the core. The second glass whose composition gives it a lower refractive index than the core glass covers the fiber and thereby produces the desired cladding.

The cladding expedient has some inherent as well as practical drawbacks, however, for certain important light guide applications. It is, for example, an added stage in the manufacturing process involving a second material coating. Also, the imperfections in the interface between cladding and core stemming from thermal incompatibility of the glasses cause light loss through scattering and absorption.

Of prime concern, additionally, is that cladding necessarily involves an abrupt change of refractive index which renders cladding unsuitable for many sophisticated light guide devices now under contemplation. For example, one property which cannot now be realized with cladding is a specific dielectric constant gradation cross sectionally in a light guide. This property could be realized, however, through a gradual transition of refractive index.

Accordingly, one broad object of this invention is to achieve a useful level of internal reflection of light energy transmitted through adjacent optical glass fibers or rods without the use of cladding in the conventional sense.

Another object of this invention is to enlarge the transmission capabilities of light guide channels.

A specific object of this invention is to impart a controlled continuous refractive index change from the core to the surface of a glass light guide.

SUMMARY OF THE INVENTION

This invention in broadest terms is addressed to achieving in alkali glass articles the requisite refractive index increase or decrease by a controlled change in the alkali metal ion concentration along a selected segment of the element which thereby defines the light guide channel. The change in alkali metal ion concentration is affected through: removal of said ions without replacement; through replacement of said ions in an ion exchange process with alkali metal ions of either larger or smaller ionic radii; or through replacement of the alkali metal ions with hydrogen ions. Although not limited thereto, the glass article configuration importantly includes optical fibers and rods. In such case the refractive index - altering alkali metal ion concentration change is affected at the surface layer of the fiber or rod.

In one illustrative embodiment of the invention, an ion exchange process involving the replacement of alkali metal ions at the glass surface with similar ions of differing ionic radius, readily achieves changes in surface refractive index of a degree highly useful in the manufacture of glass light guiding elements. Changes of refractive index in either direction can be affected. An index reduction is realized by replacement of the alkali metal ions in the glass with similar ions of smaller ionic radii; and an index increase is obtained through replacement with ions of larger ionic radii. The basic process in this embodiment of the invention is one of ion exchange carried out through a diffusion process at elevated temperatures in the presence of a suitable ion source, followed preferably by an annealing step, especially where index increases are desired. In general, the replacement ions are selected from the group consisting of the alkali metal ions--namely, lithium, sodium, potassium rubidium, and cesium--and hydrogen ions.

Surface refractive index reductions, for example, are achieved which differ only slightly from the core glass, i.e., by 0.1 percent or less. This condition is quite desirable for single mode propagation in fibers whose diameters may be many times the wavelength of light. Alternatively, changes of the order of a percent or greater are also realized through the invention. The latter degree of refractive index change in a glass fiber or rod is desirable where total energy transmission efficiency is critical such as for multimode propagation in large fibers.

Removing the surface alkali metal ions without replacing them with other ions is achieved for example, by passing a mixture of dry sulfur-dioxide and air over the glass element in an insulated oven at temperatures exceeding 500° C. A diffusion outward of sodium and oxygen occurs; and, these, on meeting the sulfur dioxide in the oven atmosphere, produce a sodium sulfate bloom while leaving a soda-depleted surface layer on the glass. This surface layer exhibits a lowered refractive index.

The above treatment carried out at temperatures of about 400° C. and including measured amounts of water vapor in the mixture, supports an ion exchange process. Sodium ions near the glass surface diffuse to the surface and react with the ambient mixture to form a bloom of sodium sulfate. A counterdiffusion of hydrogen ions from the water vapor into the glass maintains electrical neutrality and produces essentially a hydrogen glass at the surface which exhibits the desired lowered refractive index.

Replacement of the alkali metal ions in the glass surface with other alkali metal ions is achieved, for example, by immersing the element in a molten alkali salt of the replacement metal such as sodium nitrate. Lower or higher surface refractive indices are achieved.

The ion exchange process at a glass surface is, of course, familiar to glass technologists in achieving low reflectivity surface coatings as well as in strengthening of glass surfaces. In such processes the reduction of refractive index is a known but gross and uncontrolled side effect. Its broad applicability to the making of glass light guides pursuant to the teachings of the present invention has, insofar as applicant is aware, heretofore been neither proposed nor tested. Specific aspects of the invention are grounded in the realization that by controlling the diffusion process parameters, a close control can be maintained over the exchanged ion layer depth, rate of treatment and magnitude of induced property change. Thus, the approach permits considerable flexibility in controlling the direction, depth and--to a degree--the gradation of refractive index changes. As such, the invention affords a preferred alternative to conventional cladding.

The invention and its further objects, features and advantages will be more fully appreciated from a reading of the description to follow of exemplary processes reflecting the inventive practice, as well as of resulting structures, in conjunction with the drawing.

DETAILED ILLUSTRATIONS OF THE INVENTIVE PROCESS

Figure 1:
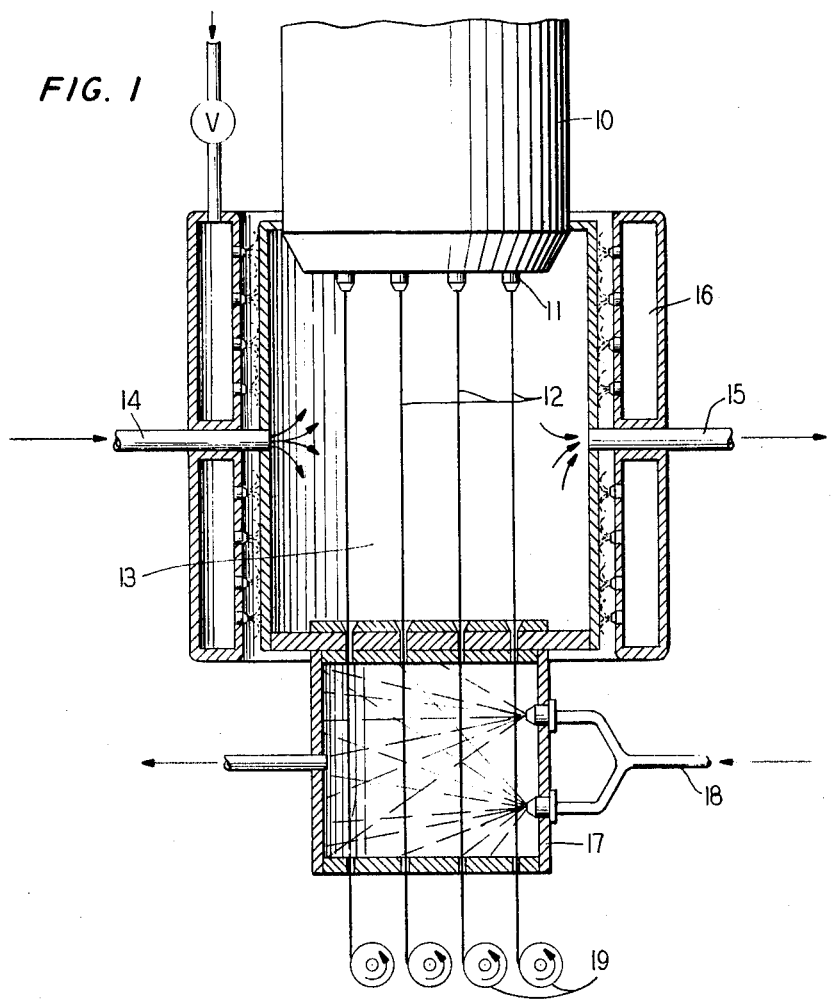
FIG. 1 is a top sectional view of an illustrative item of apparatus which practices one form of the inventive process.

As used herein, the term ion exchange means the replacement of whichever of the alkali metal ions is present in the surface namely $Li^+$, $Na^+$, $K^+$, $Rb^+$, and $Cs^+$, with alkali metal ions of either smaller or larger ionic radius or with $H^+$. Replacement with cations of smaller ionic radii will produce a refractive index decrease. Replacement with larger cations will produce an increase in index. Several exemplary procedures, their results and variations are given first, followed by illustrations of specific structures readily realizable through the process.

EXAMPLE 1

One-fourth-inch diameter by 4-inch long cylindrical specimens of the glass composition $Na_2O$-$Al_2O_3$-$SiO_2$ in 1-1-3 proportions by weight respectively, and other specimens 1 inch long by 15/16 inch wide by one eighth inch thick of the same composition were placed in a 1-inch I.D. fused silica tube. The tube was placed in the bore of a standard tube furnace with temperature-sensing means therein. Oven temperature was maintained at 600° C. An ambient consisting only of dry $SO_2$ was established in the oven and a 50 cc./min. flow thereof through the oven was maintained. The specimens were held under these conditions for a period of 4 hours. After treatment the specimens were annealed to a temperature of 140° C. at a rate of 10° C. per hour in an atmosphere of $SO_2$. Thereafter, a ¼-inch long wafer was cut from the center of the treated cylinders. The end faces of the wafer were polished optically flat and parallel.

The end faces were examined under a projection microscope and a metallograph microscope, using a polished but untreated piece as a standard. The treated specimens showed a well-defined demarcation between an optically different surface layer and the bulk material which was about 10 microns thick. Refractive index measurements were made with a Zeiss Abbe Refractometer upon the flat specimens. Whereas the glass originally had a refractive index of 1.5028±0.0002, the refractive index of the treated surfaces was between 1.4920 and 1.4902, corresponding to a 0.7 percent decrease. This represents a gradual, monotonic transition from core to outer surface. The change corresponds to almost a 10° acceptance cone half-angle for fiber optical cladding.

EXAMPLE 2

Samples were prepared and treated exactly as described in Example 1, except that the flowing ambient within the oven consisted of 50 cc./min. of $SO_2$ mixed with 1,000 cc./min. of water vapor-saturated $O_2$. Microscope and refractometer readings showed a depth of diffusion of about 15 microns. The refractive index change at the surface is the same here as in Example 1 since it is the $Na_2O$ content at the surface which controls the maximum refractive index decrease. The addition of oxygen and water vapor enhanced the diffusion mechanism by an appreciable factor.

Sulfur dioxide chemical treatment is successful with soda glass because it readily induces the necessary hydrogen-for-sodium exchange, or soda diffusion outward in the glass composition, without altering the glass basic structure. The controlled sulfur dioxide-water vapor atmosphere at the glass surface establishes the desired concentration gradient of sodium or soda in the glass by fixing the diffused sodium in a stable compound such as sodium sulfate so that it will not return to the glass.

Other environments than sulfur dioxide-air-water vapor can also provide the desired ion exchange. Essentially any compound which combines with $Na_2O$ at high temperature, as for example Zirconium Oxide, can be used to produce a gas which reacts with $Na^+$ to form a stable compound at the glass surface.

A specific alternative environment consists, for example, of molten salts with the desired replacement cation. The primary function of the environment is to deplete the particular alkali metal ions from the surface layer and, if desired, to replace them with a suitable monovalent cation of differing ionic radius. The cations need not be monovalent, but these are readily workable in practical applications.

In Example 2 above, a decreased surface refractive index in soda glass is realized by exchanging the sodium ions with a cation having a smaller ionic radius and a lower density. Suitable cations for soda glass include $H^+$, as exemplified above; and also $Li^+$. For other types of glass, such as a $K_2O$-$Al_2O_3$-$SiO_2$ composition, the exchange of $K^+$ ions for ions of smaller ionic radii and lower density produces the desired lowered refractive index. Such exchange ions include $Na^+$, $Li^+$, and $H^+$. An example of a process for affecting a lowered surface refractive index by exchanging $Na^+$ for $K^+$ follows, which is representative of processes for the exchange of alkali metal ions for the purposes of the present invention.

EXAMPLE 3

Glass fibers of 25 mils diameter fabricated from the composition $K_2O$-$Al_2O_3SiO_2$ in 1-1-3 proportions by weight are preheated to a temperature of about 350° C. and then immersed in a molten sodium nitrate bath maintained at a temperature of about 350° C. Each fiber segment is subjected to the bath for about 10 minutes with the fibers advancing continuously through the bath. As the fibers exit from the bath, they are annealed by subjecting them to dry nitrogen gas at a temperature of 450° C. for a period of an hour. Thereafter, the fibers are gradually cooled to room temperature and then washed with water and dried. The smaller sodium ions are diffused into the glass surface to a maximum depth of about 50 microns, with their concentration greatest at the outermost surface.

Typically, depths of tens of microns are achieved in the process of Example 3, the depths being controlled by the diffusion time.

As earlier noted, the change of refractive index produced by the inventive process can be in the direction of an index increase. The steps involved are the replacement of the alkali metal surface ions by larger more dense ones and the subsequent annealing of the specimen. Examples include the replacement of $Na^+$ by $K^+$ or by $Cs^+$. A molten salt bath of potassium nitrate, for example maintained at 800° F. serves as a source of $K^+$ ions for the replacement of $Na^+$ ions at the proper surface of a light guide to achieve the desired refractive index increase.

By varying the glass composition, ambient atmosphere or thermal cycle in the above-exemplified processes, thick surface layers of the order of tens of microns, or smaller layers of the order of 1 micron are achievable. Furthermore, the magnitude of maximum index change in these layers may be held within prescribed limits. The significance of this flexibility is that a layer of arbitrary thickness can be placed on a glass surface without the sudden transition created by actually superimposing a second material. The net result is that a continuous gradation of refractive index can be obtained which is not otherwise obtainable.

The invention is applicable to an essentially unlimited range of glasses and relative compositions. The following table is representative:

| Ingredient | Percent by Weight |
|---|---|
| $Na_2O$ or $K_2O$ | 5 to 25 |
| $SiO_2$ | 50 to 100 |
| $Al_2O_3$ or $CaO$ | 0 to 25 |

The desired magnitude of refractive index change determines how much diffusable material, such as $Na_2O$, should be present in the glass composition. The depth of layer desired influences the choice of glass composition, since deeper layers of the order of 100 microns are more readily obtainable with soda-alumina-silica glass compositions, for example.

FIG. 1 illustrates in schematic fashion how the present inventive process can be combined with the production of optical fibers to eliminate the cladding step. A glass melt 10 feeds a set of drawing heads 11 from which numerous glass fibers 12 of arbitrary diameter are drawn. From the drawing heads, the fibers emerge directly into a suitable ion exchange-producing ambient within a chamber 13.

A gas mixture consisting of 50 cc./min. $SO_2$ and 1,000 cc./min. of water-saturated $O_2$ is directed constantly through the chamber 13 via inlet 14 and exits at outlet 15. The gas ambient and the glass composition can, for instance, be those mentioned in Example 2, supra. A temperature of about 400° C. is maintained by conventional gas ring burner 16. The chamber dimensions and the times needed for each step depend, of course, on the depth of layer desired and the glass used. The bloom generated on the fiber surface by the ion exchange is next removed in a wash 17 fed from inlet 18 with a fluid such as water. The fibers are then collected on reels 19.

Figure 3:
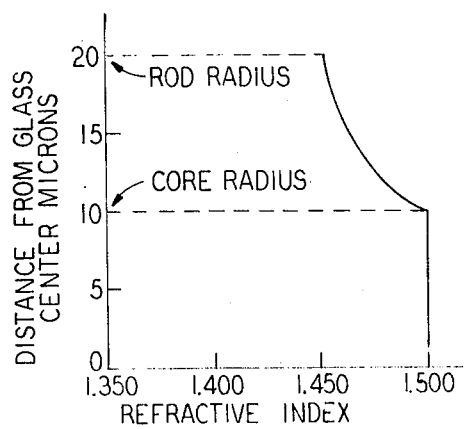
FIG. 3 is a graph depicting a refractive index profile achievable by the process.
Figure 2:
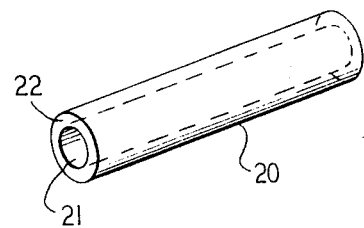
FIG. 2 is a schematic side view of a structure achieved through the invention.

A specific application of the invention is illustrated in the making of a device such as pictured in FIG. 2. This device is an optical channel which is made from a glass fiber or rod 20 having the general composition $Na_2O$-$Al_2O_3$-$SiO_2$. It is desired to produce an optical path such as 21 in rod 20, in which a continuous and ideally (for small layers) quadratic dielectric constant gradation occurs across the section of the rod denoted as 22. The specific gradation desired can be realized by producing a definite refractive index gradient as depicted in FIG. 3. While such a gradient cannot be produced with conventional cladding, it is closely approximated by resorting to the present inventive process, for example, in the manner just described with respect to FIG. 1.

Figure 4:
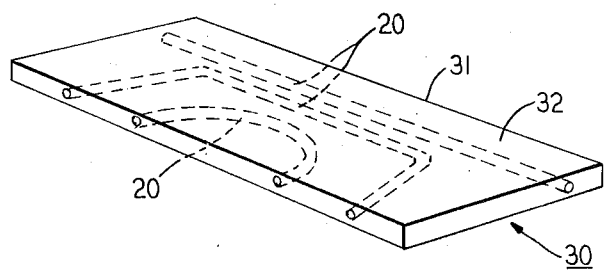
FIG. 4 illustrates an optical guiding device utilizing structures provided by the inventive process.

The treated rods 20 are then used in the making of an optical beam-guiding device, designated 30, and shown in FIG. 4. Device 30 consists of several of the fibers or rods 20 embedded in precut channels in a glass or other suitable plate 31, in some configuration required by the optical functions being carried out. Alternatively, the rods 20 could be affixed to the surface 32 of plate 31, as with cement, and thereafter overlaid with a suitable coating material such as a thin layer of epoxy resin.

Figure 5:
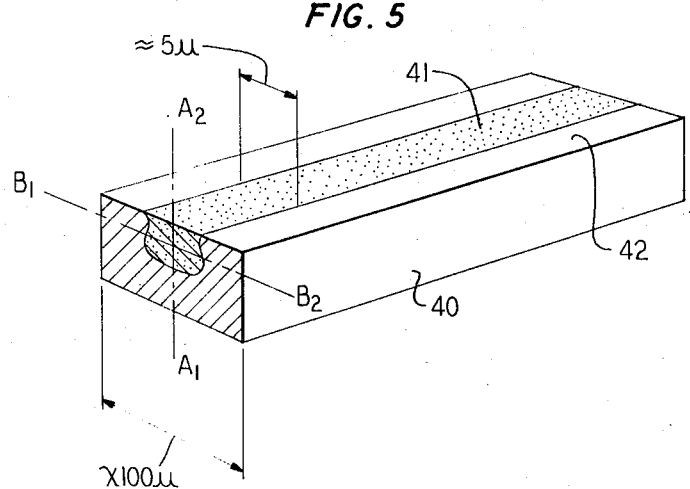
FIG. 5 is a schematic perspective view of a further inventive structure.
Figure 5B:
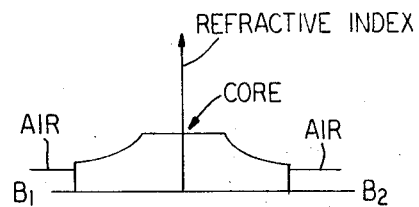
FIGS. 5a and 5b are graphs depicting refractive index profile in the FIG. 5 structure.
Figure 5A:
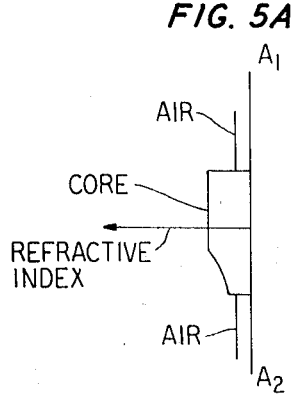

Another application of the inventive process is in the construction of the optical substrate illustrated in FIG. 5. Substrate 40 is a homogeneous glass slab of composition $Na_2O$-$Al_2O_3$-$SiO_2$ in approximately 1-1-3 proportion by weight. Its size, is for example, of the order of the rod suggested in FIG. 3. It is desired to place in substrate 40 an optical transmission channel having a continuous and substantially quadratic dielectric constant gradation across some portions of the sections A—A and B—B. Pursuant to the invention, a surface refractive index reduction is affected by masking out a path 41 on the surface 42 of substrate 40. The slab is subjected at an elevated temperature of about 400° C. to a flow of sulfur dioxide gas substantially as stated in Example 1. The duration of exposure varies considerably, depending upon the desired depth of channel and the other factors already mentioned. When the desired channel depth is reached, the slab is washed to remove the bloom material; and thereafter the masking material is removed. The resulting refractive index profiles which delineate the channel are illustrated and further explained in FIGS. 5a and 5b.

It is to be understood that the embodiments described herein are merely illustrative of the principles of the invention. Various modifications may be made thereto by persons skilled in the art without departing from the spirit and scope of the invention.

What is claimed is:

1. A method for making a sodium glass optical fiber characterized by an axial core having a constant refractive index and a thin region surrounding said core having a refractive index that decreases in a direction radially outwardly from said core to the outer surface of said fiber, comprising the steps of:

subjecting, at approximately 400° C., a fiber having the composition $Na_2O$-$Al_2O_3$-$SiO_2$ to flowing sulfur dioxide gas and to substantially greater quantities of flowing water-saturated oxygen; the flow being continued for a time sufficient to induce an outward diffusion of ions of sodium near said surface and to induce a counterdiffusion of hydrogen ions into said surface; and halting both said flows when a desired hydrogen ion penetration and concentration gradient is achieved, the depth of said penetration from said outer surface defining said thin region;

said hydrogen ion concentration coupled with said sodium ion outward diffusion resulting in said decreasing refractive index gradient of said region.

2. Method pursuant to claim 1 wherein said sulfur dioxide flow-rate is substantially 50 cc. per minute and said water-saturated oxygen flow-rate is substantially 1,000 cc. per minute.

3. Method for producing in a glass substrate an optical transmission channel characterized by a central region extending a preselected distance from the substrate surface inwardly, and having a refractive index that gradually increases from a first value at the substrate surface to a second constant value at a zone within the substrate core, comprising the steps of:

masking out a path on the surface of a substrate having the composition $Na_2O$-$Al_2O_3$-$SiO_2$; and subjecting said substrate at approximately 400° C. to flowing dry sulfur dioxide gas;

said sulfur dioxide inducing an outward diffusion of ions of said sodium from a region beneath the unmasked portion of said substrate; and the said outward diffusion resulting in said gradually increasing refractive index in said central region.

* * * * *